(12) United States Patent
Dümmen

(10) Patent No.: US 6,601,342 B2
(45) Date of Patent: Aug. 5, 2003

(54) CULTURE TRAY FOR THE ROOTING OF YOUNG PLANTS

(76) Inventor: Marga Dümmen, Dammweg 18-20, 47495 Rheinberg (DE)

( * ) Notice: Subject to any disclaimer, the term of this patent is extended or adjusted under 35 U.S.C. 154(b) by 0 days.

(21) Appl. No.: 09/996,949

(22) Filed: Nov. 28, 2001

(65) Prior Publication Data

US 2002/0035803 A1 Mar. 28, 2002

Related U.S. Application Data

(63) Continuation-in-part of application No. 09/349,881, filed on Jul. 8, 1999, now abandoned.

(30) Foreign Application Priority Data

Sep. 25, 1998 (DE) .......................... 198 44 020

(51) Int. Cl.[7] ................................ A01G 31/00

(52) U.S. Cl. ..................................... 47/62 C

(58) Field of Search .................. D11/155; 47/65.5, 47/65.9, 66.1, 73, 77

(56) References Cited

U.S. PATENT DOCUMENTS

| 3,751,852 A | | 8/1973 | Schrepper |
| 4,982,527 A | * | 1/1991 | Sprung ........................ 405/118 |
| 5,409,510 A | | 4/1995 | Houweling |
| 5,581,936 A | * | 12/1996 | Belgiorno ..................... 47/18 |
| 5,664,370 A | * | 9/1997 | Boudreau et al. ............ 47/66.5 |

FOREIGN PATENT DOCUMENTS

| DE | 2950724 | 2/1995 |
| FR | 2661068 | 4/1990 |

* cited by examiner

*Primary Examiner*—Charles T. Jordan
*Assistant Examiner*—Francis T. Palo
(74) *Attorney, Agent, or Firm*—Galgano & Burke

(57) ABSTRACT

A culture tray for the rooting of young plants in parallel rows including an open-top housing having a base wall and a peripherally extending edge. The housing-base wall defines a plurality of transversely extending channels which accommodate a multiplicity of generally cup-shaped pots having bottom walls with a drainage hole. The tray-base wall is arranged at a lower position in relation to the surrounding edge and the transversely directed channels are provided in the tray base wall at a certain distance apart.

24 Claims, 5 Drawing Sheets

62    63    64

65    66    67

68    69    70

CULTURE TRAY FOR THE ROOTING OF YOUNG PLANTS

This application is a continuation-in-part of U.S. Ser. No. 09/349,881 filed Jul. 8, 1999 (now abandoned).

BACKGROUND OF THE INVENTION

The invention relates to a culture tray for the rooting of young plants which has parallel arranged rows that accommodate downwardly depending or oriented pots which have holes in their base wall and which has a surrounding edge or wall enclosing the tray.

A well-known culture tray has pot-like hollows or pots which are located in rows arranged in parallel with one other, and which are open at the top and have an opening with a smaller diameter in their base. The smaller opening in the base serves to allow one to remove the young plant and its associated root impregnated ball of soil out of the pot-like hollow from the bottom and to allow surplus water to drain away. This culture tray has a rectangular shape and a surrounding edge or wall.

Another culture tray well-known from EP 0 657 096 A1 has two supports in the first row instead of the two outermost pots and, in the last row instead of the two second-outermost pots, two supports which are hollow, open at the bottom and oriented upwards. In this case, the two second-outermost pots in the last row are each provided with one supporting ring on the base and one centering attachment is provided at the top end of each support. The supports exhibit an opening in their walls pointing towards the culture tray. The supporting rings on the base of the two outermost pots and of the two second-outermost pots exhibit lateral recesses.

A great deal of water is required in order to water the plants in these well-known culture trays. For a variety of reasons, it is desirable to minimize the consumption of water specifically:

1. A high consumption of water has a negative influence on the greenhouse climate. Diseases (above all, fungal diseases) are promoted by this.
2. Water is not always available in a sufficient quantity.
3. Excessive irrigation will harm the plants, especially the leaves.

SUMMARY OF THE INVENTION

It is an object of the present invention to create a culture tray for which, in comparison to the prior art, a minimum of water is necessary for the watering of the plants.

The present invention is a culture tray for young plants to take roots, in which a multiplicity of pots, consisting of rows of individual pots, are hooked into transversely directed channels. The lateral top edges of the individual pots are shaped in such a way that they close the channels completely after the individual pots have been placed. The channels can be arranged in similar or dissimilar distances, where, for an enhanced irrigation between two adjacent channels or to the tray edge of the culture tray, areas of the tray base, which are part of the culture tray, are raised. The aforementioned areas are, in comparison with the channels or the placed multiplicity of pots, raised sloping to both sides. Thus, in case of artificial irrigation of the culture tray, this measure ensures that the water is evenly supplied directly to the individual pots at both sides of the raised areas. What is particularly advantageous, is that no water can remain on the raised areas and hence only the least amount of water required is used for irrigation, which is, subsequently, specifically favorable for a sensitive ecological system such as a greenhouse for young plants in the rooting process. The walls may reach up to or below the panel sections and turn into a surrounding edge.

In a further embodiment of the invention, the multiplicity of pots may be provided with at least one hole for the drainage and removal of the surplus water which hole is preferably located above the base wall of the channel. It is advantageous that the housing base wall has wall sections defining a bottom wall for each of said channels and said pots are provided with a bottom wall with at least one hole for the drainage of surplus water which pot bottom wall is spaced above the bottom wall of said channels and that the plant pots have top edges defining open top ends and wherein said culture tray has ledges on which said top edges of said pots are supported.

In a further embodiment of the invention, the opposite base sidewalls defining the channels may extend conically downwardly and the sidewalls of the multiplicity of pots may also extend conically downwardly.

In order to fit the culture tray to different kinds of plants with luxuriant foliage, the invention provides that the roof strips cover one or even several channels. Not only does this measure reduce the number of young plants or the individual pots placed but in spite also ensures an optimum irrigation by the water draining off over the roof strips. The areas between two channels and/or the surrounding edge of the culture tray are individually elevated in form of relatively flat round or pointed loops, which do not impair the irrigation or the plant growth, in order to support the roof strips. The roof strips are supported by said elevations at their lower edge and are thus safely positioned parallel to the channels. If exceptionally large plants are grown the roof strips can, in particular, be used to cover one or several channels. The shape of the areas between the channels of the culture tray or the roof strips should be selected so that it is located elevated opposite the channels and/or the multiplicity of pots sloping to both sides. Particularly suitable are either convexed, rounded, acute, triangular, trapezoid stepped or diamond shaped roofs. The various cross sections can also be combined with each other so that the aforementioned prerequisites are met to ensure, to a sufficient degree, the draining off of the water towards the individual pots.

Moreover, it is desirable that the pots each have two flanges at their tops which stick out on both sides and are supported on the stepped ledges. It is particularly advantageous that several culture trays can be hooked together in order to form one longer row of culture trays.

Furthermore, the invention relates to an assembly of culture trays arranged in a row consisting of several culture trays for the rooting of young plants with rows arranged in parallel with each other to accommodate pots oriented downwards with holes in the base of the pots and with a surrounding edge enclosing the culture tray whereby the culture trays are hooked to each other. Most desirably, the row of culture trays consists of one starting tray, at least one center tray and one end tray.

In a further embodiment of the invention, the starting tray is trimmed at its end oriented towards the row of culture trays, the end tray is also trimmed at its end directed towards the row of culture trays and that the center tray is trimmed on both sides in such a way that the starting tray and the end tray can be hooked into the adjacent center tray on one side and the center tray can be hooked on both sides into the adjacent starting tray or into the adjacent end tray or into another adjacent center tray.

BRIEF DESCRIPTION OF THE DRAWINGS

The invention is explained in greater detail below on the basis of the appending drawings, wherein similar reference numerals denote similar elements throughout the various views.

DETAILED DESCRIPTION OF THE PREFERRED EMBODIMENT

Figure 1:
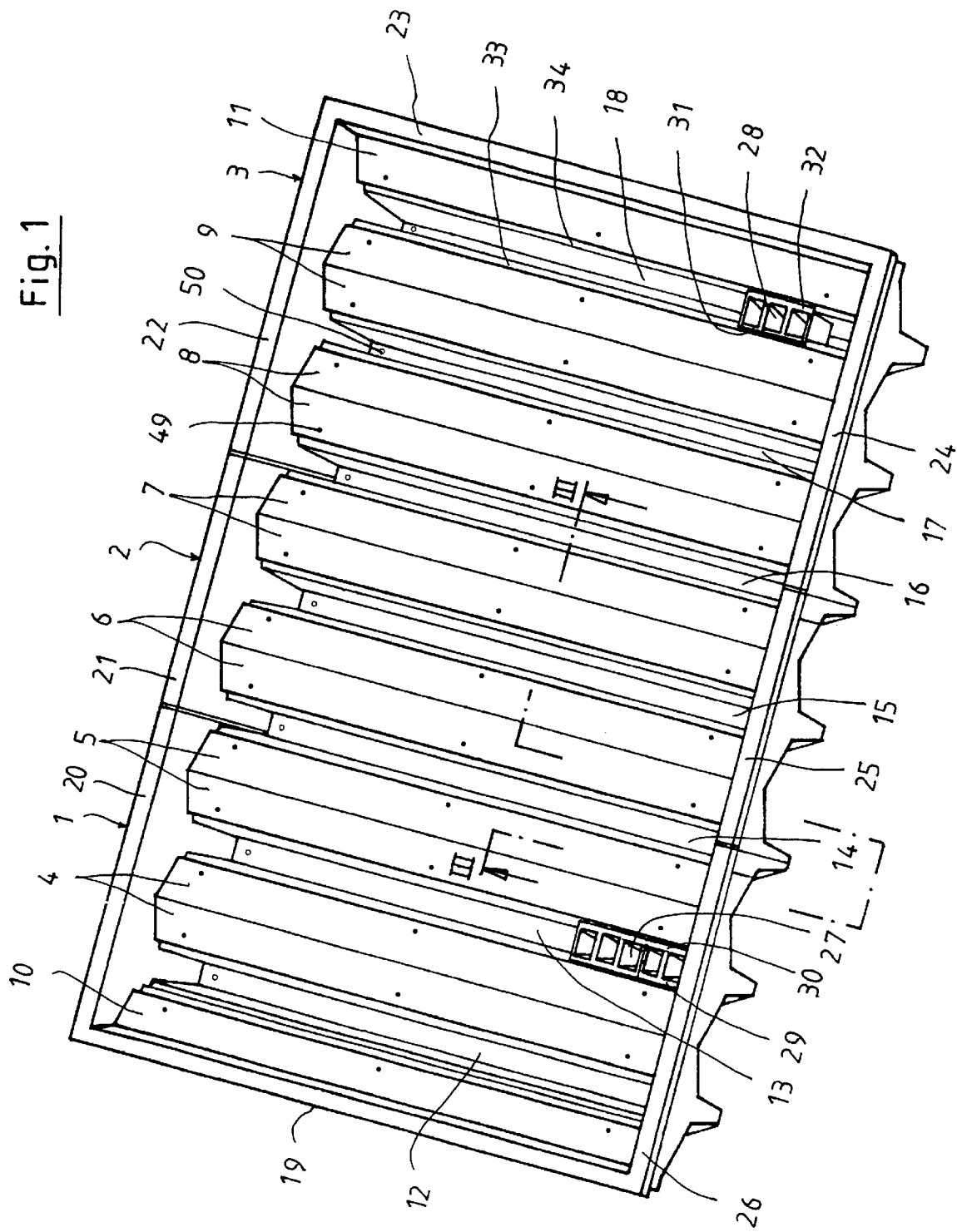
FIG. 1 is a perspective view of a row of culture trays consisting of individual culture trays hooked into each other.

The culture tray shown in the drawings is used for the rooting of young plants.

The row of culture trays shown in FIG. 1 consists of a starting tray 1, a center tray 2 and an end tray 3.

Figure 4:
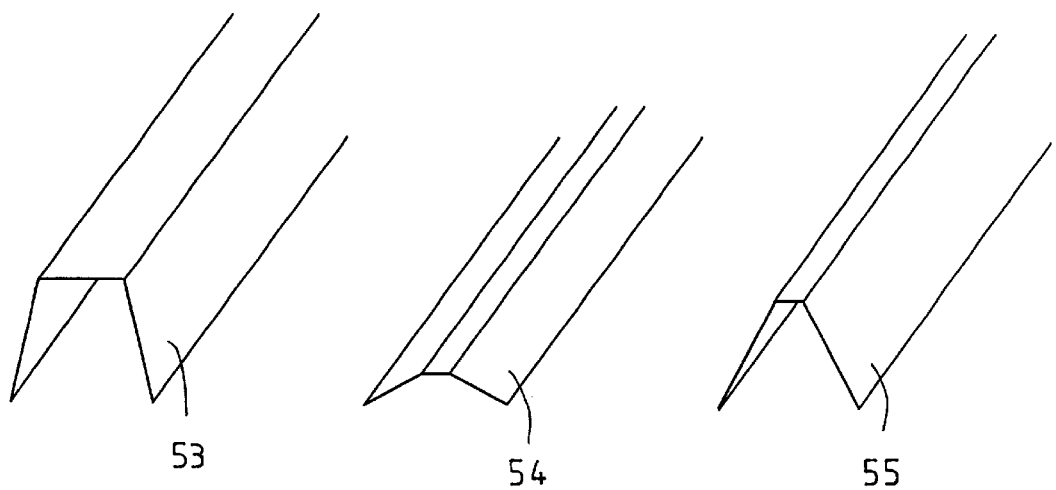
FIG. 4 is a perspective view of various round and triangular shaped roof strips to cover the channels in the culture tray and FIG. 5 shows further stepped, trapezoid roof strips to cover the channels.
Figure 4:
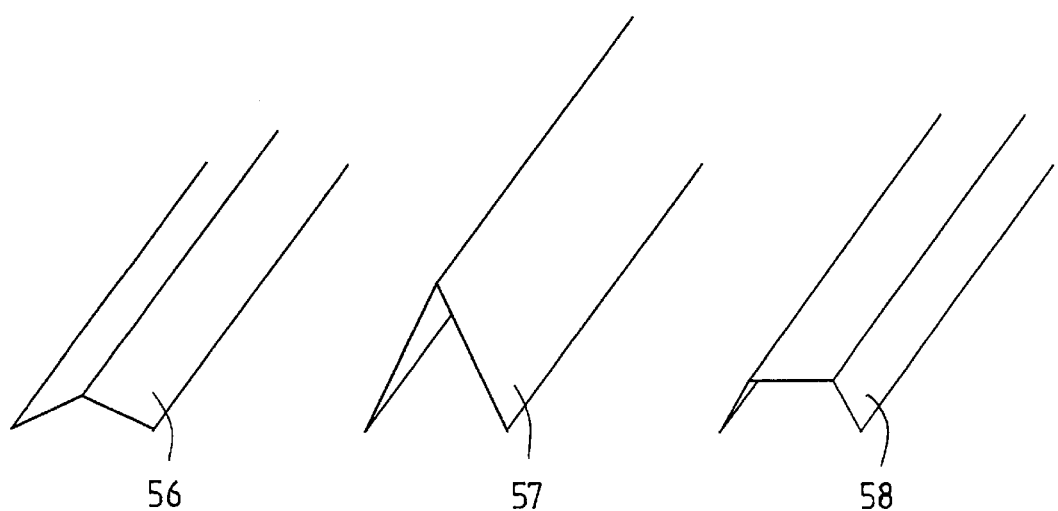
Figure 4:
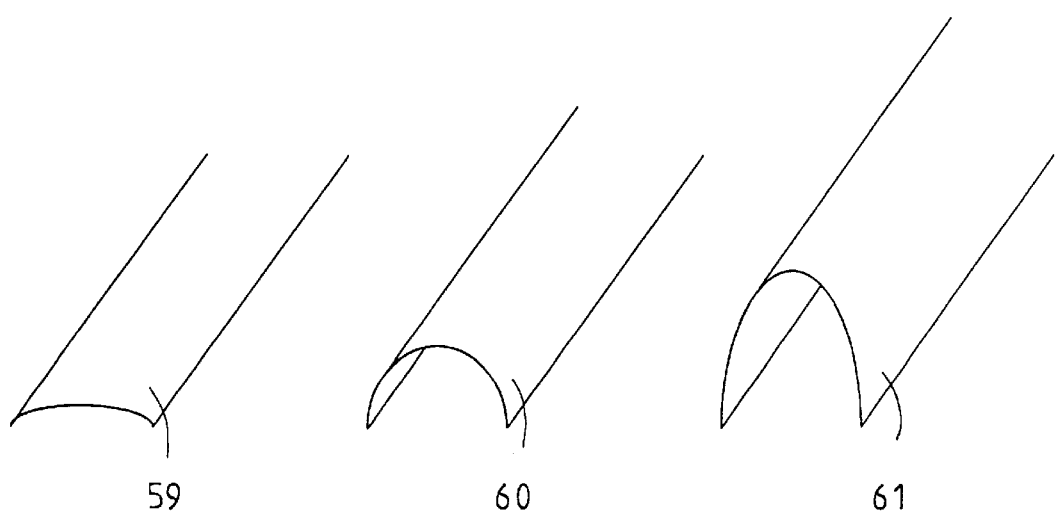
Figure 5:
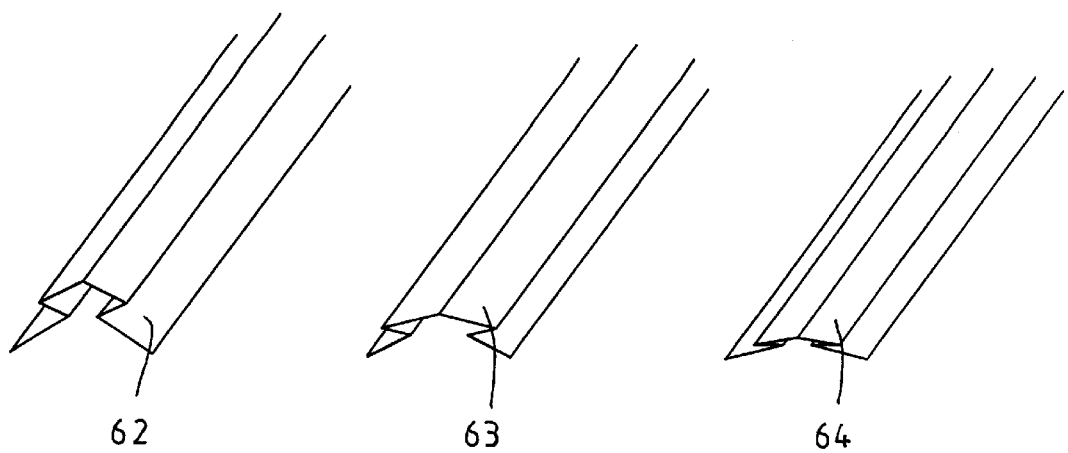
Figure 5:
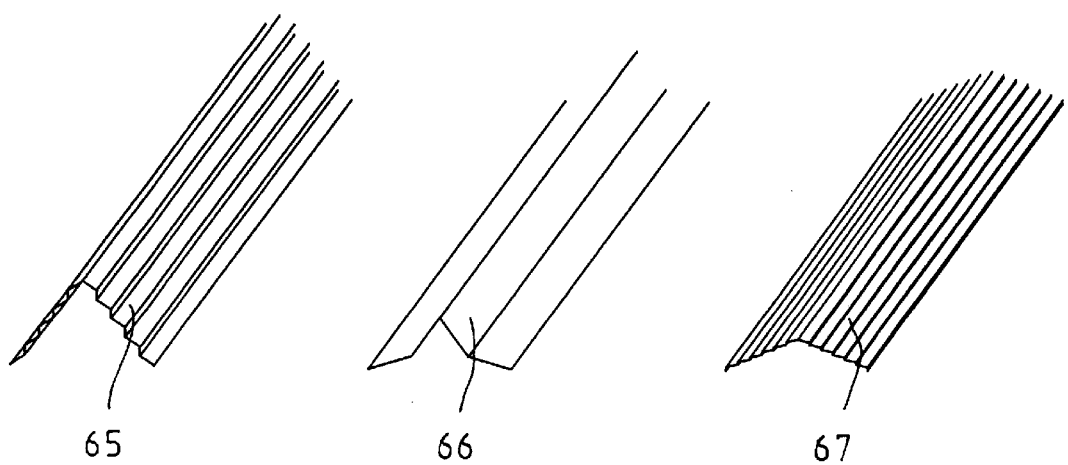
Figure 5:
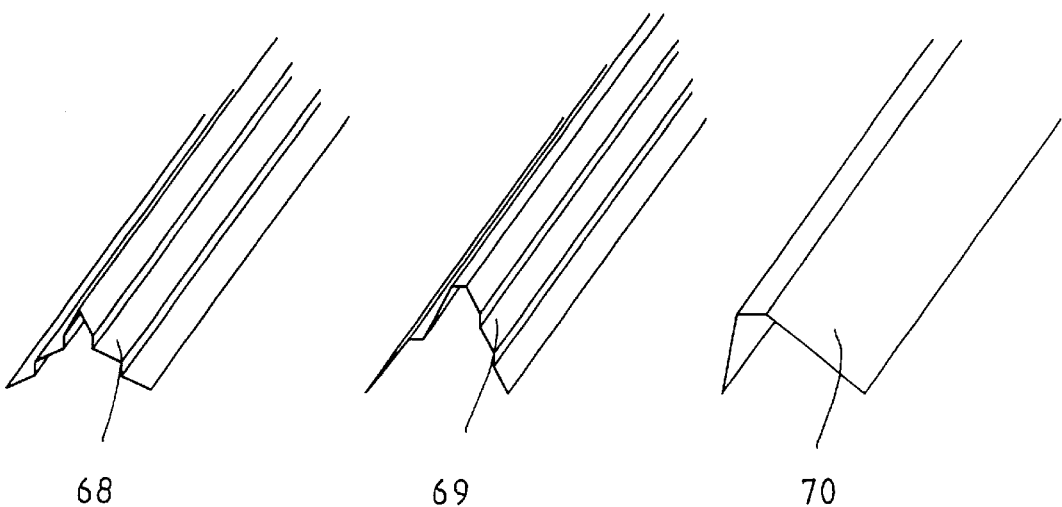

The base of the row of culture trays is composed of roof shaped panel sections 4–11, between which channels 12–18 are arranged. Moreover, the culture trays provide a surrounding edge 19–26, which is hoisted in comparison with the panel sections 4–11 and channels 12–18. As an example, five multiple pots 27 are placed in channel 13 and three individual pots 28 are placed in channel 18. It is, however, possible to place a larger number of multiple pots, i.e., up to twenty-six individual pots in each channel. The multiple pots 27, 28 each have two flanges 29–32 at their sides, which are supported by the stepped ledges 33, 34 at the upper end of the walls forming channel 18. The conically shaped walls 43, 44 support the also conical individual pots, which do not touch the base of channel 12–18 with their base area. The panel sections 4–11 are, in comparison with the channels 12–18 or the multiplicity of pots 27, 28, elevated sloping to both sides. The example shows a preferred implementation with an inverted-V shaped roof. FIGS. 4 and 5 show further possible roofs, which can be used alternatively. It should merely be provided that the water to be irrigated can drain off of the panel sections 4–11 and is then either supplied to the multiplicity of pots 27, 28 containing the young plants or again to the irrigation system through the channels 12–18. Spaced-apart, loop shaped one-piece elevations 49 preferably cornered or round (not shown) are disposed on the panel sections 4–11 which are intended to support a roof strip 51, 52 as shown in FIG. 4 or 5. The loops 49 are positioned in such a way that the draining-off water can easily run into the multiplicity of pots 27, 28.

The example according to FIG. 1 shows the starting tray 1, the center tray 2 and the end tray 3 hooked together in order to form a closed culture tray.

To allow the surplus water, which emerges from the base opening of the individual pots or multiplicity of pots 27, 28, to drain off of the culture tray at least one drilling 50 into the base walls of the channels 12–18 should be provided. It is of course possible to provide several drillings at least towards the edges of channels 12–18.

Figure 2:
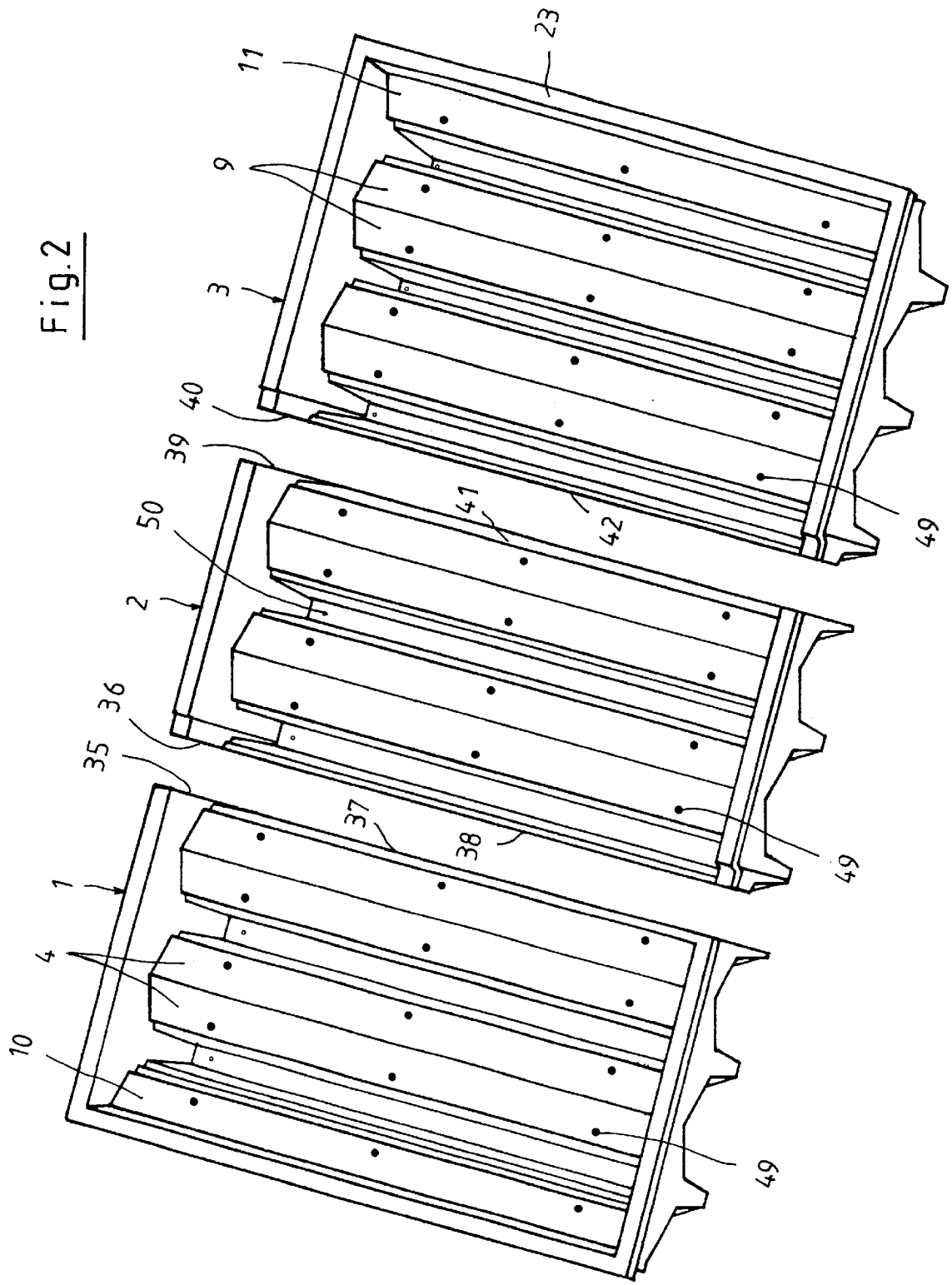
FIG. 2 is a perspective view of the row of culture trays according to FIG. 1 with individual culture trays unhooked and arranged at a mutual distance apart.

FIG. 2 shows a row of culture trays according to FIG. 1 with individual unhooked culture trays—namely starting tray 1, center tray 2 and end tray 3. The same reference numbers as in FIG. 1 are used. The starting tray 1 is trimmed at its end 35 oriented towards the center tray 2. The center tray 2 is also trimmed at its end 36 directed towards the starting tray 1 and the ends are trimmed in such a way that the starting tray's 1 outer wall 38 of the channel is higher than the outermost wall 37 of the center tray's 2 channel whereby both trays 1 and 2 are hooked together. The end tray 3 is trimmed at its end 40 directed towards the center tray 2. The center tray 2 is also trimmed at its end 39 directed towards the end tray 3 in such a way that the walls 41 of the center tray 2 are higher than the wall 42 of the end tray 3 whereby both trays 2 and 3 are hooked together. There are no deviations inasmuch as the examples in FIG. 1 are concerned.

Figure 3:
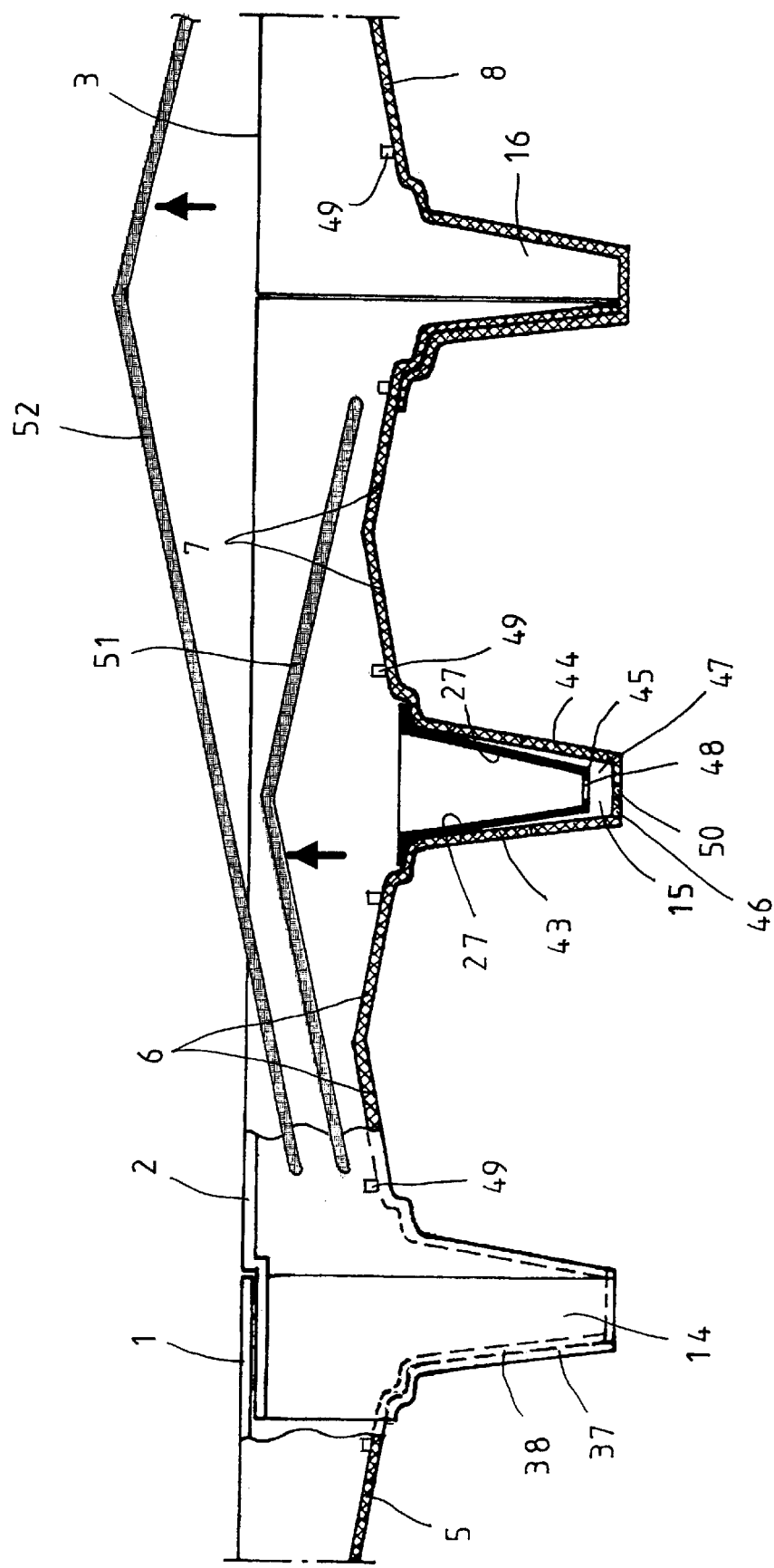
FIG. 3 is a longitudinal sectional view through the row of culture trays taken along line III—III of FIG. 1, additionally showing one plant pot held in the center tray

FIG. 3 is a longitudinal sectional view of the center tray 2 with two adjacent trays, which can be the starting 1 or end tray 3. It is, however, possible that additional center trays are hooked together in the same way before the starting 1 or end trays 3 are hooked. The wall 37 of the starting tray 1 is higher than the wall 38 of the center tray 2, whereby these walls form a part of channel 14. A multiplicity of pots 27 can be located in channel 15 formed by the two walls 43 and 44. An intermediate space 47 serving as a water collecting area is left between the base walls 45 of the pots 27 and the base wall 46 of the channel 15 so that the water exiting through base opening 48 of the pots 27 can drain or flow away in the lower area of channel 15.

Furthermore, the longitudinal sectional view clearly shows the elevation in form of loops 49 on the single panel sections 4–11. The loops 49 are slightly higher than the panel section 4–11 so that one roof strip 51 can be put on to cover a single channel or that a roof strip 52 to cover at least three channels. The example in FIG. 3 shows a cross section of a triangular roof strip 51, 52, it is, however, possible to use various cross sections, as shown in FIGS. 4 and 5. It should merely be provided that the lower ends of the roof strips 51, 52 are adjacent to the loops 49. The water is advantageously supplied through the roof strips to the open channels to ensure an optimum water supply of individual pots with distanced plants. This is also a possibility to minimize water, so that the ecological system of a greenhouse is not affected by excessive water consumption.

FIG. 4 shows several examples of roof stripes 53–61 which can be placed on the channels. The upper row shows roof strips 53–55, whereas the center row shows two triangle shapes and a further trapezoid shape. The lower row shows slightly convexed to rounded roof strips 59–61.

FIG. 5 shows further roof strips 62–70, which are diamond shaped with a rebound in the upper row, whereas the two lower rows show stepped roof strips with various slopes. The stepped shaped strips show vertical and diagonal sections.

What is claimed is:

1. A culture tray for young plants to take root in parallel rows to support pots oriented towards the base which have openings of a smaller diameter in their base walls surrounding the culture tray, whereby the tray base is arranged at a lower position in relation to the walls and transversely directed channels at predefinable distances apart from one another are arranged on the tray base, whereby a multiplicity of pots, having top edges shaped in such a way that they close the channels completely, are hooked in the parallel channels, consisting or rows of pots, and that the channels located between two adjacent areas of the tray base are part of the culture tray and, in comparison with the channels or the multiplicity of pots, are raised sloping to both sides.

2. A culture tray according to claim 1, wherein said channels are arranged in similar or dissimilar lengths.

3. A culture tray according to claim 2, wherein said channels are provided with at least one hole through which surplus water may flow into a water-collection system.

4. A culture tray according to claim 3, wherein said housing base wall has wall sections defining a bottom wall for each of said channels and said pots are provided with a bottom wall with at least one hole for the drainage of surplus water wherein the pot bottom wall is spaced above the bottom wall of said channels.

5. A culture tray according to claim 4, wherein said plant pots have top edges defining open top ends and wherein said culture tray has ledges on which said top edges of said pots are supported.

6. A culture tray according to claim 5, wherein said housing base wall has sidewalls defining opposite walls of the channels which extend conically downward and wherein said multiplicity of pots each have sidewalls which also extend conically downward.

7. A culture according to claim 1, wherein the areas between said channels with parallel elevations have loops to support a roof strip.

8. A culture tray according to claim 7, wherein roof strips are intended to cover several channels.

9. A culture tray according to claim 1 wherein the areas between said channels of the culture tray or the roof strips are generally convex.

10. A culture tray according to claim 9, wherein the different cross sections can be combined, preferably in different angles of inclination.

11. A culture tray according to claim 1, wherein a plurality of said culture trays are provided and each include means for hooking together said trays in order to effectively form one long row of culture trays.

12. A culture tray according to claim 11, wherein a plurality of culture trays arranged in a row each comprise an open-top housing having a base wall and a peripherally extending edge, said base wall defining a plurality of transversely extending and spaced-apart channels which may accommodate the multiplicity of plant pots, said housing base wall being arranged at a lower position in relation to said peripherally extending edge and said transversely directed channels being provided in the housing base wall at predefinable distances apart from one another wherein said channels are provided with at least one hole through which surplus water may flow into a water-collection system and wherein said housing-base wall has wall sections located between two adjacent channels which are arranged in a pitched roof shape, said row of culture trays including one starting tray, at least one center tray, and one end tray, each of said trays including a surrounding edge at least particularly enclosing said tray and a multiplicity of plant pots arranged in parallel rows, said plant pots having open top ends, and sidewalls depending from said top ends which merge with a pot-bottom wall having a hole, and means for hooking said culture trays to each other in a row.

13. A culture tray according to claim 12, wherein said means for hooking includes each of said trays having at least one trimmed end which is dimensioned and configured to hook into a trimmed end of one of the other trays and wherein said starting tray and said end tray have trimmed end sections at their respective ends directed towards the row of culture trays and wherein at least one center tray has trimmed ends on both of its ends whereby said starting tray and said end tray can be hooked into said center tray on opposite ends thereof and said center tray can be hooked on opposite ends into an adjacent starting, center or end tray.

14. A culture tray according to claim 1, wherein a plurality of said culture trays are provided and each include means for hooking together said trays in order to effectively form one long row of culture trays.

15. A culture tray for the rooting of young plants in parallel rows in a multiplicity of plant pots, comprising:

an open top housing having a base wall and a peripherally extending edge, said base wall defining a plurality of transversely extending and spaced apart channels which may accommodate the multiplicity of plant pots, said housing base wall being arranged at a lower position in relation to said peripherally extending edge and said transversely directed channels being provided in the housing base wall at predefinable distances apart from one another wherein said channels are provided with at least one hole through which surplus water may flow into a water-collection system and wherein said housing base wall has wall sections located between two adjacent channels which are arranged in a pitched roof shape, wherein said multiplicity of plant pots are arranged next to each other and supported in said channels.

16. A culture tray according to claim 15, wherein said plant pots have top edges defining open top ends and wherein said culture tray has ledges on which said top edges of said pots are supported.

17. A culture tray according to claim 15, wherein said pots have top edges which are shaped and dimensioned to cover said channels completely.

18. A culture tray according to claim 15, wherein said housing base wall has wall sections defining a bottom wall for each of said channels and said pots are provided with a bottom wall with at least one hole for the drainage of surplus water which pot bottom wall is spaced above the bottom wall of said channels.

19. A culture tray according to claim 15, wherein said housing base wall has wall sections located between two adjacent channels which are arranged in a roof shape.

20. A culture tray according to claim 15, wherein said housing base wall has sidewalls defining opposite walls of the channels which extend conically downwardly and wherein said multiplicity of pots each have sidewalls which also extend conically downwardly.

21. A culture tray according to claim 16, wherein said top edges of said pots each has two flanges on opposite sides thereof which are supported on said ledges.

22. A culture tray according to claim 15, wherein a plurality of said culture trays are provided and each include means for hooking together said trays in order to effectively form one long row of culture trays.

23. An assembly of culture trays for the rooting of young plants, comprising:

a plurality of culture trays arranged in a row each comprising an open top housing having a base wall and a peripherally extending edge, said base wall defining a plurality of transversely extending and spaced-apart channels which may accommodate the multiplicity of plant pots, said housing base wall being arranged at a lower position in relation to said peripherally extending edge and said transversely directed channels being provided in the housing base wall at predefinable distances apart from one another wherein said channels are provided with at least one hole through which surplus water may flow into a water-collection system and wherein said housing base wall has wall sections located between two adjacent channels which are arranged in a pitched roof shape, said row of culture trays including one starting tray, at least one center tray, and one end tray, each of said trays including a surrounding edge at least particularly enclosing said tray and a multiplicity of plant pots arranged in parallel rows, said plant pots having open top ends, and sidewalls depending from said top ends which merge with a pot bottom wall having a hole, and means for hooking said culture trays to each other in a row.

24. An assembly of culture trays according to claim 23, wherein said means for hooking includes each of said trays having at least one trimmed end which is dimensioned and configured to hook into a trimmed end of one of the other trays and wherein said starting tray and said end tray have trimmed end sections at their respective ends directed towards the row of culture trays and wherein said at least one center tray has trimmed ends on both of its ends whereby said starting tray and said end tray can be hooked into said center tray on opposite ends thereof and said center tray can be hooked on opposite ends into an adjacent starting, center or end tray.

* * * * *